(12) United States Patent
Myrland

(10) Patent No.: US 6,745,514 B1
(45) Date of Patent: Jun. 8, 2004

(54) CONTAINER FOR SHIPPING AND/OR DISPLAY OF FLORA

(76) Inventor: Brian Myrland, 735 James Cir., Verona, WI (US) 53562

( * ) Notice: Subject to any disclaimer, the term of this patent is extended or adjusted under 35 U.S.C. 154(b) by 0 days.

(21) Appl. No.: 10/360,974

(22) Filed: Feb. 6, 2003

Related U.S. Application Data

(60) Provisional application No. 60/355,168, filed on Feb. 11, 2002, and provisional application No. 60/365,852, filed on Mar. 20, 2002.

(51) Int. Cl.[7] ................................................ A01G 9/02
(52) U.S. Cl. .......................................................... 47/84
(58) Field of Search ............................... 47/84; 206/423

(56) References Cited

U.S. PATENT DOCUMENTS

| | | |
|---|---|---|
| 1,270,554 A | 6/1918 | Rubel |
| 3,127,011 A | 3/1964 | Weddle |
| 3,973,356 A | 8/1976 | Schacht |
| 4,046,935 A | 9/1977 | Wilkinson et al. |
| 4,051,277 A | 9/1977 | Wilkinson et al. |
| 4,069,917 A | 1/1978 | Stollberg et al. |
| 4,071,064 A | 1/1978 | Saul |
| 4,096,305 A | 6/1978 | Wilkinson et al. |
| 4,113,093 A | 9/1978 | Hendrickx |
| 4,119,265 A | 10/1978 | Dlugopolski |
| 4,330,059 A | 5/1982 | Freeman |
| 4,726,468 A | 2/1988 | Hesser et al. |
| 4,898,273 A | 2/1990 | Kristiansen |
| 4,915,224 A | 4/1990 | Wulf et al. |
| 4,936,046 A | 6/1990 | Miller |
| 4,941,572 A | 7/1990 | Harris |
| 5,029,708 A | 7/1991 | Alonso et al. |
| 5,060,799 A | 10/1991 | De Pagter |
| 5,224,598 A | 7/1993 | Angeles et al. |
| 5,377,905 A | 1/1995 | Sigrist |
| 5,379,549 A | 1/1995 | Carcich et al. |
| 5,427,240 A | 6/1995 | Holtkamp, Jr. |
| 5,454,213 A | 10/1995 | Gola |
| 5,710,641 A | 1/1998 | Lowry et al. |
| 6,050,412 A | 4/2000 | Clough et al. |
| 6,061,955 A | 5/2000 | Domstein |
| 6,185,863 B1 | 2/2001 | Tabbert |
| 6,474,017 B1 | 11/2002 | White |

*Primary Examiner*—Peter M. Poon
*Assistant Examiner*—Bethany L Griles
(74) *Attorney, Agent, or Firm*—Craig A. Fieschko, Esq.; DeWitt Ross & Stevens S.C.

(57) ABSTRACT

A container for shipping and/or display of flowers includes a watertight or water-resistant inner receptacle for holding flowers and water; an outer shipping and display sleeve which protects the flowers and inner receptacle during shipping and display; and a holding unit which supports the inner receptacle within the outer sleeve at least during shipping. These components may be made of paperboard (e.g., corrugated cardboard) if desired. For shipping, the inner receptacle (with flowers and water) may be placed in the holding unit, which may then be placed in the outer sleeve for shipping purposes. Upon arrival, the holding unit and inner receptacle may be removed from the outer sleeve, which may be converted into a display pedestal for the holding unit and inner receptacle if desired.

23 Claims, 3 Drawing Sheets

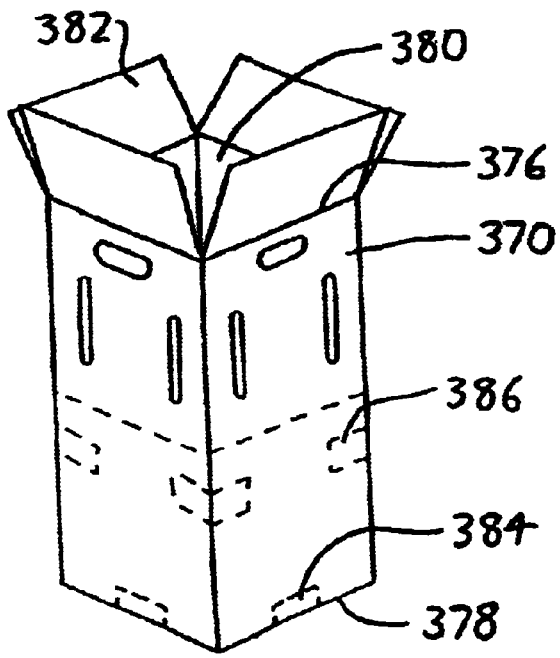
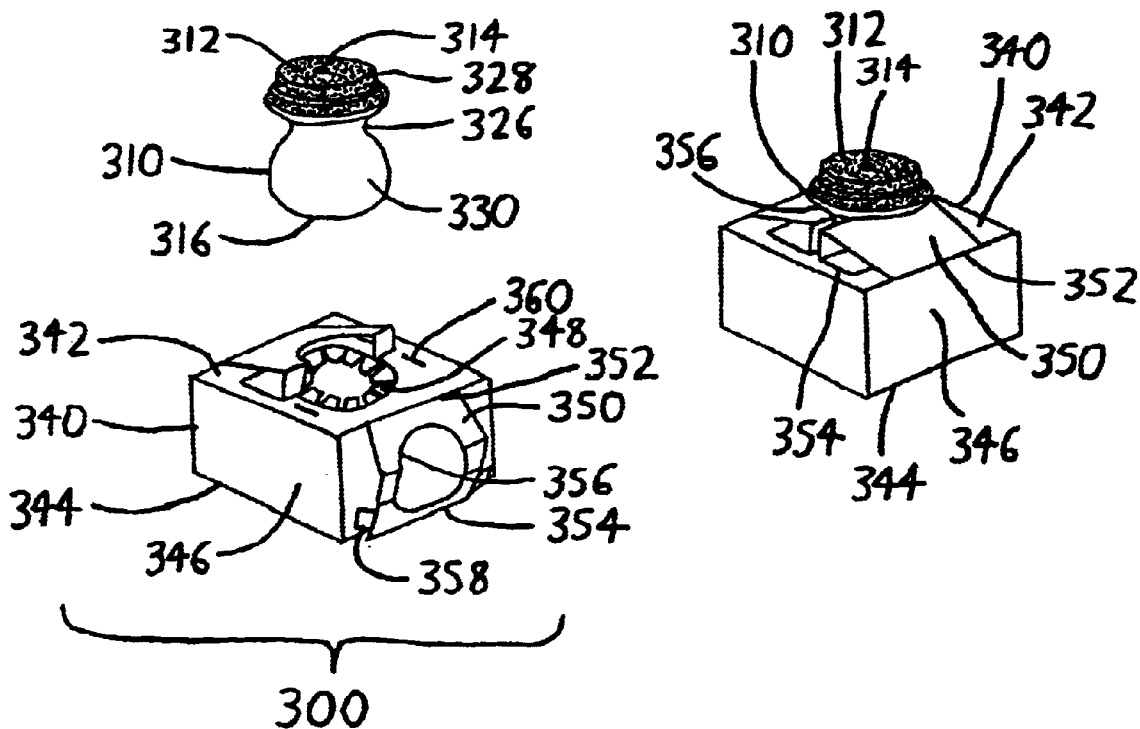

CONTAINER FOR SHIPPING AND/OR DISPLAY OF FLORA

CROSS-REFERENCE TO THE RELATED APPLICATIONS

This application claims priority under 35 USC §119(e) to the following U.S. Provisional Patent Applications:
No. 60/355,168 filed Feb. 11, 2002
No. 60/365,852 filed Mar. 20, 2002
The entireties of these provisional applications are incorporated by reference herein.

FIELD OF THE INVENTION

This document concerns an invention relating generally to methods and apparata for shipping and displaying flora (particularly cut flowers), and more specifically to shipping and display systems made of paperboard which are suitable for mail or common courier shipment, and/or retail display, of one or more bouquets.

BACKGROUND OF THE INVENTION

As noted, for example, in U.S. Pat. No. 5,060,799 to De Pager, it is common to ship flora (i.e., flowers or other plants) in water-filled buckets, or in water-filled cardboard boxes treated with wax or plastic for water resistance, wherein a cardboard box is simply fitted over the flora-bearing bucket or box to protect it during shipment. Once the packed flora reaches its destination, the outer box is removed from the inner flora-bearing container so that the flora can be accessed. As noted in De Pager, and as well known in the trade, such arrangements are imperfect because they are expensive (in both material and shipping costs), they result in spillage/leakage, they do not adequately protect the flora from shipping damage, and the unattractive nature of the inner flora-bearing container generally requires that the flora be removed from the container and transferred to a more attractive container for display or marketing purposes. It would therefore be useful to have available methods and apparata for shipping and display of flora wherein the flora may be shipped in a hydrated state (i.e., wherein they have access to water to prevent drying out); wherein water spillage/leakage and plant damage is deterred or avoided entirely; and wherein the shipped flora are instantaneously (or nearly so) ready for display once shipping is completed.

SUMMARY OF THE INVENTION

The invention involves a container for shipping and/or display of flora which is intended to at least partially solve the aforementioned problems. To give the reader a basic understanding of some of the advantageous features of the invention, following is a brief summary of certain preferred versions of the invention. As this is merely a summary, it should be understood that more details regarding the preferred versions may be found in the Detailed Description set forth elsewhere in this document. The claims set forth at the end of this document then define the various versions of the invention in which exclusive rights are secured.

As exemplified by the exploded assemblies depicted in FIGS. 2 and 3, a container 200/300 for shipping and/or display of flora includes an inner receptacle 210/310 which is capable of holding liquid without substantial leakage, so that flowers and water may be placed therein; an outer shipping and display sleeve 270/370 which protects the flowers and inner receptacle 210/310 during shipping and display; and a holding unit 240/340 which supports the inner receptacle 210/310 within the outer sleeve 270/370 during shipping and display. Each of these components—which are preferably formed of paperboard (i.e., paper, cardboard, or other lignocellulosic materials provided in sheet form or formable into thin walls, including lignocellulosic/plastic composites)—will now be discussed in turn.

The liquid-retaining inner receptacle 210/310 has a receptacle top 212/312 having a top receptacle opening 214/314 wherein flowers may be inserted, and an opposing receptacle bottom 216/316. As can be seen from a comparison of FIGS. 2 and 3, the inner receptacle 210/310 may take a variety of forms, with FIG. 2 depicting an arrangement which is particularly useful for shipment of bulk cut flowers or flower bouquets for later display and resale, and FIG. 3 depicting an arrangement which is particularly useful for shipment of arranged flowers in ready-to-display form.

The holding unit 240/340 has a holding unit top 242/342, an opposing holding unit bottom 244/344, and circumferential holding unit sides 246/346 extending therebetween. A holding unit top 242/342 opening sized for insertion of the receptacle bottom 216/316 is defined in the holding unit top 242/342, allowing the receptacle bottom 216/316 to be fit into the holding unit top 242/342 so that flowers situated in the inner receptacle 210/310 will be supported within the holding unit 240/340 to extend upwardly through the holding unit top opening 214/314. As can be seen from FIGS. 2 and 3, the holding unit 240/340 may take a variety of forms depending on the configuration of the inner receptacle 210/310 and on other factors.

The outer sleeve 270/370 has outer sleeve sidewalls 272/372 separated by outer sleeve corners 274/374, with the outer sleeve sidewalls 272/372 extending between an outer sleeve top 276/376 and an opposing outer sleeve bottom 278/378, and surrounding an outer sleeve interior passage 280/380 extending therebetween. The outer sleeve interior passage 280/380 is sized to closely receive the holding unit 240/340 therein with the holding unit sides 246/346 resting closely adjacent the outer sleeve sidewalls 272/372. The outer sleeve sidewalls 272/372 have engaging tabs 286/386 defined therein which are foldable into the outer sleeve interior passage 280/380 to support the holding unit 240/340 within the outer sleeve interior passage 280/380. The engaging tabs 286/386 are preferably defined on the outer sleeve corners 274/374, and extend across at least two adjacent outer sleeve sidewalls 272/372, for durability and strength of support. The outer sleeve top 276/376 preferably has foldable closure flaps 282/382 extending therefrom so that they may be folded shut to protect flowers situated in the inner receptacle 210/310 and holding unit 240/340. In contrast, the outer sleeve 270/370bottom preferably defines a terminal end of the outer sleeve sidewalls 272/372 so that the outer sleeve interior passage 280/380 remains permanently open at the outer sleeve 270/370 bottom, thereby allowing easy insertion and/or removal of the holding unit 240/340 within the outer sleeve interior passage 280/380 when desired by simply placing the outer sleeve 270/370 bottom over the holding unit 240/340, or lifting the outer sleeve 270/370 off the holding unit 240/340. However, in cases where it is desirable to band the container 200/300 shut (as depicted in FIG. 1), it can be useful to provide foldable bottom flaps 284/384 on portions of the outer sleeve 270/370 bottom, with the bottom flaps 284/384 preferably being spaced from the outer sleeve corners 274/374.

In use, the inner receptacle 210/310 can be fully or partially filled with water, and flower stems can be inserted into the top receptacle opening 214/314 so that the flowers are situated upright. The inner receptacle 210/310 can then be inserted within the holding unit 240/340 (if not already installed therein) by placing it into the holding unit top 242/342 opening (with the inner receptacle 210/310 and flowers oriented upright). The holding unit 240/340 can then be installed within the outer sleeve 270/370 by placing the outer sleeve 270/370 over the holding unit 240/340 from the outer sleeve 270/370 bottom, or by placing the holding unit 240/340 into the outer sleeve top 276/376, so that the holding unit 240/340 is situated within the outer sleeve interior passage 280/380 adjacent the outer sleeve 270/370 bottom. If desired, the engagement tabs 286/386 might then be folded into the outer sleeve interior passage 280/380 so that the holding unit 240/340 is supported at its holding unit top 242/342 from moving upwardly within the outer sleeve interior passage 280/380. The outer sleeve 270/370 can be banded about its height (as illustrated in FIG. 1) by a plastic or metal strip, tape, string, or some other form of band 102 so that the holding unit 240/340 is also supported at its holding unit bottom 244/344 from falling downwardly out of the outer sleeve interior passage 280/380. The flowers are then securely maintained within the container 200/300 and can be safely shipped.

When the container 200/300 arrives at its destination, the band 102 may be cut or otherwise removed, and the outer sleeve 270/370 may be lifted off of the holding unit 240/340 to leave the flowers resting upright within the inner receptacle 210/310 and holding unit 240/340. The flowers can then be displayed in this form (with prior removal of the holding unit 240/340 if desired). However, as depicted by the exemplary arrangement in FIG. 4, the flowers might also be displayed by then inserting the holding unit 240/340 into the outer sleeve top 276/376 until the holding unit bottom 244/344 is supported on the engaging tabs 286/386, with the inner sleeve then acting as a pedestal for supporting the holding unit 240/340.

Further versions of the invention, and the advantages, features, and objects of the various versions of the invention, will be apparent from the following detailed description in conjunction with the associated drawings.

BRIEF DESCRIPTION OF THE DRAWINGS

FIG. 2A provides an exploded perspective view of the invention; FIG. 2B provides a perspective view of the inner receptacle 210 of FIG. 2A in its unfolded state.

FIGS. 3A and 3B depict an exemplary version of the invention which is particularly useful for shipment of a single prepared flower bouquet for immediate display once it reaches its destination. FIG. 2A provides an exploded perspective view of the invention, and FIG. 2B provides a perspective view of the inner receptacle 310 and holding unit 340 of FIG. 3A after being combined for shipping.

DETAILED DESCRIPTION OF PREFERRED EMBODIMENTS OF THE INVENTION

Figure 2C:
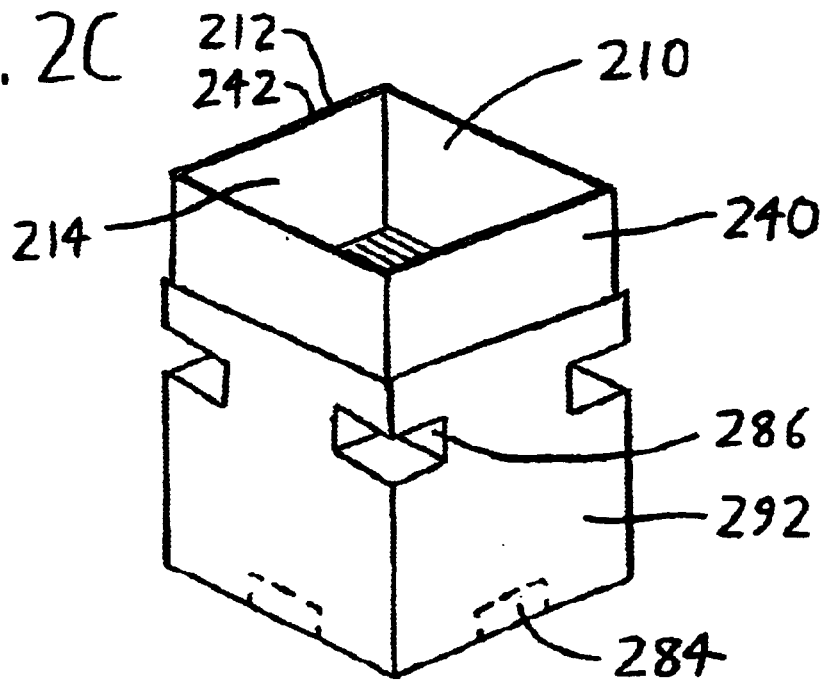
FIG. 2C provides a perspective view of the inner receptacle 210, holding unit 240, and the lower sidewall portion 292 of the outer sleeve 270 of FIG. 2A arranged for display of flowers after shipping.
Figure 2A:
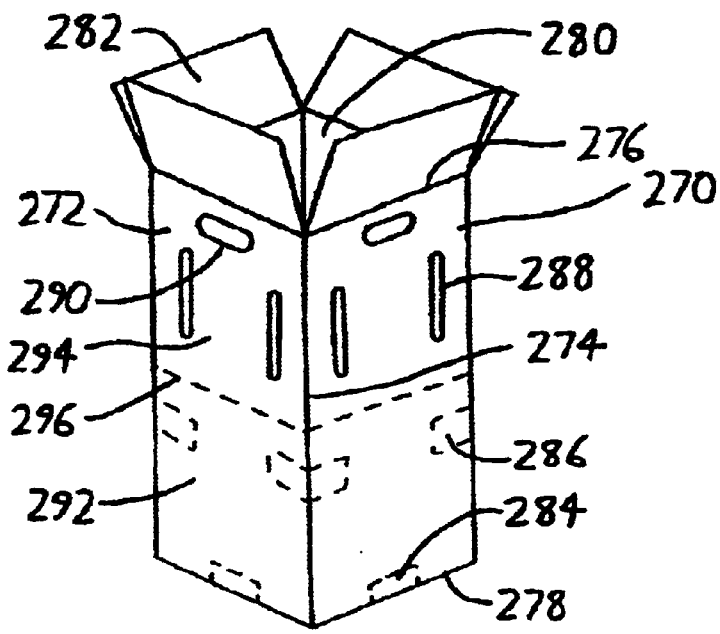
FIGS. 2A and 2B depict an exemplary version of the invention which is particularly useful for shipment of bulk cut flowers or flower bouquets for later display and resale.
Figure 2B:
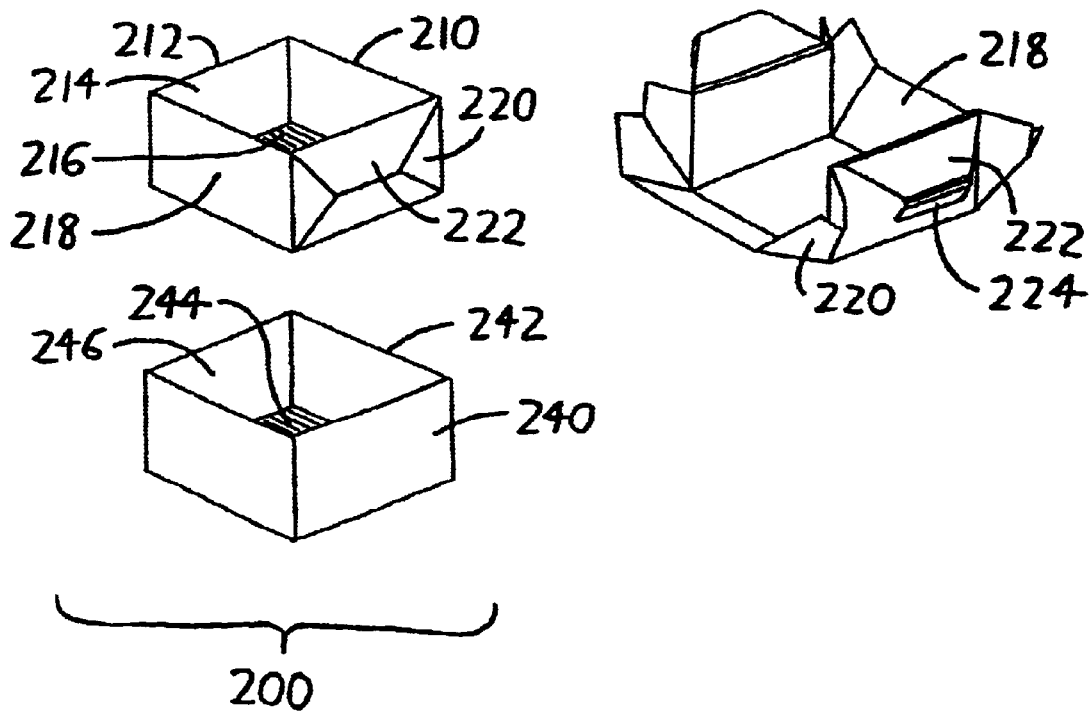

Referring to the drawings, a first preferred version of the invention, as depicted in FIGS. 2A–2B, will now be discussed in greater detail. The container 200 of FIG. 2A, has an inner receptacle 210 for holding flora (such as cut flowers) and water for hydrating the flora; an outer shipping and display sleeve 270 which protects the flowers and inner receptacle 210 during shipping and display; and a holding unit 240 which supports and protects the inner receptacle 210 within the outer sleeve 270 during shipping and display. All of the inner receptacle 210, outer sleeve 270, and holding unit 240 are preferably formed of paperboard (most preferably of the corrugated cardboard type), which is an advantageous material owing to its relatively low expense, its relatively high strength/weight ratio (thus making it well suited for shipping purposes), and the ability to easily print directly onto the paperboard. Each of the inner receptacle 210, outer sleeve 270, and holding unit 240 will now be discussed in turn.

In the container 200, the liquid-retaining inner receptacle 210 preferably takes the form of an open-topped box which is capable of holding flowers, as well as water for hydrating the flowers (if hydrating water is required), without leakage. The inner receptacle 210, which is preferably formed of a folded one-piece paperboard blank, includes a receptacle top 212 having a top receptacle opening 214 wherein flowers may be inserted, and an opposing receptacle bottom 216. Referring to FIG. 2B, the inner receptacle 210 is shown in partially unfolded form, and is seen to have inner receptacle sidewalls 218 separated by wings 220 which fold beneath flaps 222, at which point the tips 224 of the flaps 222 may be folded beneath the wings 220 to hold the inner receptacle 210 in the completed, box-like form depicted in FIG. 2A without the assistance of adhesives. The configuration/folding arrangement depicted in FIG. 2B is beneficial because it results in an inner receptacle 210 which has no bottom or side seams from which water can leak. However, the inner receptacle 210 may have sizes and configurations different from the one shown, and it need not be formed in the manner depicted. For example, other leak-resistant containers and container forming methodologies are known in the art, with examples being depicted in U.S. Pat. No. 4,119,265 to Dlugopolski, U.S. Pat. No. 5,377,905 to Sigrist, and other patents cited in (or citing to) these patents.

To further assist in preventing leakage from the inner receptacle 210, it is preferably treated to be water-resistant or waterproof, as by applying wax and/or plastic coatings to its paperboard. Many other alternative or additional coatings and/or impregnants for rendering paperboard resistant or impervious to water and/or vapor are known in the art; see, e.g., U.S. Pat. Nos. 4,046,935, 4,051,277, and 4,096,305 to Wilkinson et al., as well as patents cited in (or citing to) these patents. However, it must be kept in mind that later recycling of the inner receptacle 210 may be desirable, and many coatings/impregnants can render paperboard unsuitable for standard recycling processes. Various coatings/impregnants can also cause difficulties with the use of standard printing processes for printing onto the paperboard, which is unfortunate since in many cases it is useful or desirable to print care and/or shipping instructions, contents labeling, and/or marketing materials on the paperboard. It is therefore useful to utilize a coating/impregnant which does not diminish the recyclability or printability of paperboard, such as the coatings/impregnants used to manufacture M-GUARD paperboard (Liberty Diversified Industries, Minneapolis, Minn., USA).

The holding unit 240 is also preferably formed as a paperboard box, though its particular manner of construction—i.e., whether it has a seamless construction—is not as critical. The holding unit 240 has a holding unit top 242, an opposing holding unit bottom 244, and circumferential holding unit sides 246 extending therebetween. A holding unit top opening 238 is defined in the holding unit top 242, and is sized to receive the receptacle bottom 216. Thus, the receptacle bottom 216 may be fit into the holding unit top 242 so that any flowers or bouquets situated in the inner receptacle 210 will be supported within the holding unit 240 to extend upwardly through the holding unit top opening 238.

Once flora is placed within the inner receptacle 210 and the holding unit 240, the holding unit 240 may in turn be placed in the outer sleeve 270. The outer sleeve 270 has outer sleeve sidewalls 272 separated by outer sleeve corners 274, with the outer sleeve sidewalls 272 extending between an outer sleeve top 276 and an opposing outer sleeve bottom 278, and surrounding an outer sleeve interior passage 280 extending therebetween. The outer sleeve interior passage 280 is sized to closely receive the holding unit 240 therein with the holding unit sides 246 resting closely adjacent the outer sleeve sidewalls 272. So that the outer sleeve 270 better protects any portions of any flora protruding from the top of the inner receptacle 210 and the holding unit 240, the outer sleeve 270 is preferably substantially taller than the holding unit 240, i.e., the length of the outer sleeve interior passage 280 between the outer sleeve top 276 and outer sleeve bottom 278 is preferably greater than the height of the holding unit 240 between the holding unit top 242 and holding unit bottom 244. To further assist in protecting flora, the outer sleeve top 276 preferably has foldable closure flaps 282 extending therefrom so that they may be folded shut to protect flowers situated in the inner receptacle 210 and holding unit 240.

Figure 1:
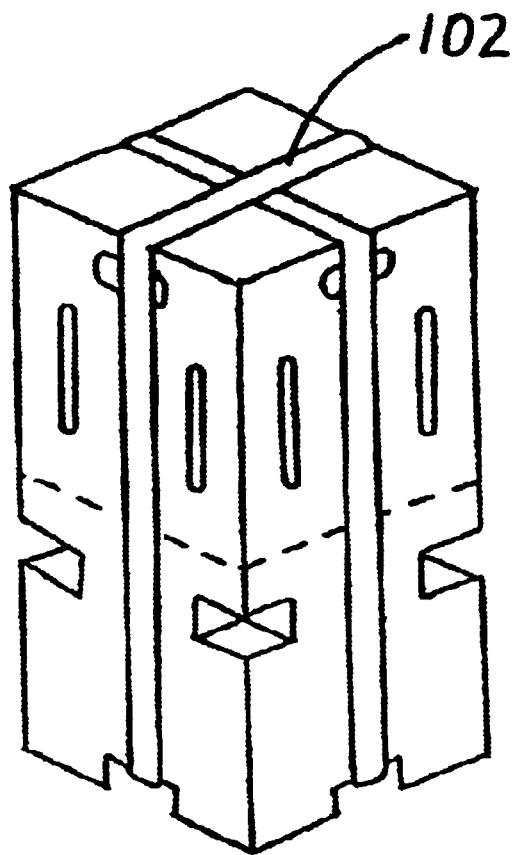
FIG. 1 is a perspective view of an exemplary version of the invention (such as the containers 200 and/or 300 depicted in FIGS. 2A and 3A) prepared for shipping of flora.

In contrast, the outer sleeve bottom 278 preferably defines a terminal end of the outer sleeve sidewalls 272 so that the outer sleeve interior passage 280 remains permanently open at the outer sleeve bottom 278, thereby allowing easy insertion of the holding unit 240 within the outer sleeve interior passage 280 when desired by simply placing the outer sleeve bottom 278 over the holding unit 240. This arrangement also allows easy removal of the holding unit 240 by simply lifting the outer sleeve 270 off the holding unit 240. However, in cases where it is desirable to band the container 200 shut (as depicted in FIG. 1), it can be useful to provide foldable bottom flaps 284 on portions of the outer sleeve bottom 278. The bottom flaps 284 are preferably spaced from the outer sleeve corners 274 so that any strapping bands 102 may encircle the container 200 about the perimeter of the outer sleeve 270 away from its corners 274, thereby better holding the various components of the container 200 together.

The outer sleeve sidewalls 272 have engaging tabs 286 defined therein which are foldable into the outer sleeve interior passage 280 to support the holding unit 240 within the outer sleeve interior passage 280. The engaging tabs 286 are preferably formed as a part of the outer sleeve corners 274, and extend across at least two adjacent outer sleeve sidewalls 272 for durability and strength of support. Thus, referring to FIG. 1, a user may (if desired) situate the holding unit 240 within the outer sleeve bottom 278, and provided the holding unit 240 is appropriately sized with respect to the distance between the bottoms of the engaging tabs 286 and the outer sleeve bottom 278 (or the bottom banding flaps 284, if present and/or used), the user may fold the engaging tabs 286 inwardly from their disengaged positions flush with the outer sleeve sidewalls 272 (as in FIG. 2A) to their engaged positions protruding into the outer sleeve interior passage 280 (as in FIG. 1). The bottoms of the engaging tabs 286 will then bear against the holding unit top 242 and will support the holding unit 240 between the tabs 286 and any banding wrapped about the bottom of the container 200, and the engaging tabs 286 will thereby prevent the upward motion of the holding unit 240 within the outer sleeve interior passage 280. However, if desired, it is not necessary to engage the engaging tabs 286 when using the container 200, since the container 200 can generally be safely shipped with gravity maintaining the holding unit 240 at the bottom of the outer sleeve 270 (and without the assistance of the engaging tabs 286). The engaging tabs 286 are nevertheless useful if the container 200 is to be used for display purposes as well as shipping purposes, as will be discussed below.

The outer sleeve sidewalls 272 may include additional features as well, such as ventilation apertures 288 to allow air exchange within the container 200 and/or handle apertures 290 for ease of handling. While not shown in FIG. 2A (or the other Figures), it is expected that the outer sleeve sidewalls 272 will generally bear shipping directions (such as "Handle with Care" and/or "This Side Up"), as well as assembly/disassembly directions. Additionally, to enhance the versatility of the container 200, it is preferable to include some means for rapidly converting the container 200 from the utilitarian form of FIG. 1 (which is well suited for shipping purposes), to a more aesthetically attractive form better suited for attractively displaying the shipped flora. As can be seen by comparing the height of the outer sleeve 270 (i.e., the length of its interior passage 280) to the height of the holding unit 240 in FIG. 2A, the entirety of the holding unit 240 may be fit within the outer sleeve 270 with additional length to spare. It is useful to regard the outer sleeve sidewalls 272 as including a lower sidewall portion 292 which extends from the outer sleeve bottom 278 to a height somewhat above the tops of the engaging tabs 286, and an upper sidewall portion 294 extending from the top of the lower sidewall portion 292 to the outer sleeve top 276. Preferably, the boundary between the lower sidewall portion 292 and the upper sidewall portion 294 is defined by a boundary line 296 which is perforated to allow the lower sidewall portion 292 and the upper sidewall portion 294 to be easily and rapidly separated, or which is at least printed on the outer sleeve sidewalls 272 so that a user may rapidly separate the lower sidewall portion 292 and the upper sidewall portion 294 by cutting. After the lower sidewall portion 292 and the upper sidewall portion 294 are separated, the engaging tabs 286 may be folded into the outer sleeve interior passage 280. The holding unit 240 may then be inserted into the lower sidewall portion 292 to be supported upon the engaging tabs 286 in a position spaced from the outer sleeve bottom 278, as illustrated in FIG. 2C. With the container 200 reconfigured in this fashion, flora within the inner receptacle 210 and the holding unit 240 may then be readily displayed. The appearance of the arrangement can be further enhanced if the lower sidewall portion 292 is printed or otherwise colored to cooperate with the holding unit 240 and/or inner receptacle 210 for an attractive appearance. Any utilitarian printing (e.g., "This Side Up") or other utilitarian features can conveniently be provided on the upper sidewall portion 294, and will thus be removed from the lower sidewall portion 292 prior to display.

To summarize a potential use for the container 200, the container 200 may first be prepared for shipping flora by fully or partially filling the inner receptacle 210 with water. Flower stems can be inserted into the top receptacle opening 214 so that the flowers are situated uptight. The inner receptacle 210 can then be inserted within the holding unit 240 (if not already installed therein) by placing it into the holding unit top opening 238, with the inner receptacle 210 and flowers oriented upright. The holding unit 240 can then be installed within the outer sleeve 270 by placing the outer sleeve 270 over the holding unit 240 from the outer sleeve-bottom 278, or by placing the holding unit 240 into the outer sleeve top 276, so that the holding unit 240 is situated within the outer sleeve interior passage 280 adjacent the outer sleeve bottom 278. If desired, the engagement tabs 286 might then be folded into the outer sleeve interior passage 280 so that the holding unit 240 is supported at its holding unit top 242 from moving upwardly within the outer sleeve interior passage 280. The outer sleeve 270 can be banded about its height (as illustrated at 102 in FIG. 1) by a plastic or metal strip, tape, string, or some other form of band 102 so that the holding unit 240 is also supported at its holding unit bottom 244 from falling downwardly out of the outer sleeve interior passage 280. The flowers are then securely maintained within the container 200 and can be safely shipped.

When the container 200 arrives at its destination, the band 102 may be cut or otherwise removed, and the outer sleeve 270 may be lifted off of the holding unit 240 to leave the flowers resting upright within the inner receptacle 210 and holding unit 240. The flowers can then be displayed in the inner receptacle 210 (after removing the holding unit 240, if desired). Alternatively, as depicted by the exemplary arrangement in FIG. 2C, the flowers might also be displayed by separating the lower sidewall portion 292 and upper sidewall portion 294, and inserting the holding unit 240 into the lower sidewall portion 292 until the holding unit bottom 244 is supported on the engaging tabs 286, with the lower sidewall portion 292 then acting as a pedestal for supporting the holding unit 240.

Turning next to FIG. 3, another exemplary version of the invention is illustrated which is particularly suited for shipping of prepared bouquets of flowers. Similarly to the version of the invention discussed previously, a container 300 has an inner receptacle 310 for holding flowers and water; an outer sleeve 370 which protects the flowers and inner receptacle 310 during shipping and/or display; and a holding unit 340 which supports and protects the inner receptacle 310 within the outer sleeve 370 during shipping and display. The outer sleeve 370 of FIG. 3A may be formed similarly or identically to the outer sleeve 270 of FIG. 2A if desired, and here the outer sleeve 370 is shown with its outer sleeve top 376, outer sleeve bottom 378, outer sleeve interior passage 380, top closure flaps 382, bottom banding flaps 384, and engaging tabs 386 labeled. The primary differences between the container 300 and the container 200 rest in the inner receptacle 310 and the holding unit 340, which will now be reviewed in greater detail.

The inner receptacle 310, like the inner receptacle 210, is intended to retain water for hydrating any flora contained therein, and it includes a receptacle top 312 having a top receptacle opening 314, and an opposing receptacle bottom 316. While the inner receptacle 310 could take the form of virtually any type of water-retaining receptacle wherein flora may be inserted, certain features are preferred. As an example, where the inner receptacle 310 is to carry water or otherwise retain moisture, the inner receptacle 310 is preferably made as resistant to spillage as possible, e.g., by providing it with a narrow neck 326 at its top receptacle opening 314. As another example, the inner receptacle 310 preferably includes some means for retaining moisture within the inner receptacle 310. For example, the inner receptacle 310 might have soft and easily puncturable or displaceable porous material situated within its interior, so that the stems of cut flowers and the like can be inserted within the porous material before or after the porous material is saturated with water. Examples of such displaceable porous materials include foamed plastics (particularly including floral foam), natural or synthetic sponges or sponge particles, hydrogels, shredded cardboard, and the like. A particularly preferred inner receptacle 310 is one of the type depicted in U.S. Pat. No. 6,185,863 to Tabbert, wherein a liquid-retaining and easily displaceable floral foam body 328 has a liquid-tight shell 330 formed over it (and also has a bottom liquid reservoir defined within the foam, with a channel leading through the foam body 328 from the top receptacle opening 314 to the reservoir to allow the reservoir to be easily filled with water). As a result, the inner receptacle 310 may be filled/saturated with water (which is retained within the foam by the outer shell 330), and flower stems may then be inserted into the foam so that the foam retains the flowers while keeping them hydrated. Inner receptacles 310 of this nature are commercially available, and have been found useful in the invention because flora may be very rapidly installed within the inner receptacles 310 for shipping and for later display upon removal from the container 300, with little or no need to adjust the flowers between shipping and display.

The holding unit 340, like the holding unit 240, is preferably formed as a paperboard box having a holding unit top 342, an opposing holding unit bottom 344, and circumferential holding unit sides 346 extending therebetween. A holding unit top opening 348 sized for insertion of the receptacle bottom 316 is defined in the holding unit top 342, allowing the receptacle bottom 316 to be fit into the holding unit top 342 so that any flowers or bouquets situated in the inner receptacle 310 will be supported within the holding unit 340 to extend upwardly through the holding unit top opening 348. However, it is preferred that the holding unit 340 includes some means for positively grasping the inner receptacle 310 and preventing its displacement from the holding unit 340 during shipment. The form of this grasping means will vary with the form of the inner receptacle 310; for example, in the container 200, the box-like inner receptacle 210, having a receptacle top 212 which is flush with the holding unit top 212, is grasped by the engaging tabs 286 (which also support the holding unit top 212). In the container 300, the grasping means is provided in two forms. First, a series of top engagement flaps 348 surround the perimeter of the holding unit top opening 348 and fold therefrom, thereby allowing the effective diameter of the holding unit top opening 348 to vary as the top engagement flaps 348 are folded inwardly or outwardly. Additionally, the top engagement flaps 348 are readily folded inwardly when pushed by an item, but they then resist the withdrawal of an item. A second alternative or additional grasping means is provided by side engagement flaps 350 having folding ends 352 situated at the holding unit sides 346 (and spaced from the holding unit top opening 348), and engagement ends 354 spaced from the folding ends 352 and having a concave area 356 thereon for receiving a portion of the narrowed neck 326 of the inner receptacle 310. The engagement ends 354 also bear insertion tabs 358 thereon for insertion within slots 360 in the holding unit top 312. Therefore, when the inner receptacle 310 is resting in the holding unit top opening 348, the side engagement flaps 350 can be folded from their folding ends 352 toward the holding unit top opening 348 to engage the narrowed neck 326 of the inner receptacle 310, at which time the insertion tabs 358 can be fit within the slots 360 to maintain the side engagement flaps 350 folded about the inner receptacle 310 (as shown in FIG. 3B). As a result, the inner receptacle 310 is firmly maintained within the holding unit 340 even if the holding unit 340 (and the outer sleeve 370) is tipped or inverted.

To summarize a potential use for the container 300, the container 300 may first be prepared for shipping a bouquet or the like by fully or partially filling the floral foam body 328 of the inner receptacle 310 with water via the top receptacle opening 314 (with the water being retained therein by the shell 330). Flower stems can be inserted into the foam body 328 so that the stems are grasped by the foam and hydrated by the water therein. The inner receptacle 310 can then be inserted within the holding unit 340 (if not already installed therein) by placing it into the holding unit top opening 348 with the inner receptacle 310 and flowers oriented upright. The inner receptacle 310 will then be engaged by the top engagement flaps 348, and the side engagement flaps 350 may be folded so that their concave areas 356 are fit about the narrowed neck 326 of the inner receptacle 310, and so that their insertion tabs 358 are engaged within slots 360 in the holding unit top 312. The holding unit 340 can then be installed within the outer sleeve 370 by placing the outer sleeve 370 over the holding unit 340 from the outer sleeve bottom 378, or by placing the holding unit 340 into the outer sleeve top 376, so that the holding unit 340 is situated within the outer sleeve interior passage 380 adjacent the outer sleeve bottom 378. If desired, the engagement tabs 386 might then be folded into the outer sleeve interior passage 380 to abut the holding unit top 342 and support the holding unit 340 against upward motion within the outer sleeve interior passage 380. The outer sleeve 370 can then be banded about its height (as illustrated in FIG. 1) by an appropriate band 102 so that the holding unit 340 is also supported at its holding unit bottom 344 from falling downwardly out of the outer sleeve interior passage 380. The flowers are then securely maintained within the container 300 and can be safely shipped.

When the container 300 arrives at its destination, the band 102 may be cut or otherwise removed, and the outer sleeve 370 may be lifted off of the holding unit 340 to leave the flowers resting upright within the inner receptacle 310 and holding unit 340. The inner receptacle 310 can then be removed from the holding unit 340 if desired, and the flowers can then be displayed in the inner receptacle 310. Alternatively, the flowers might be displayed in the inner receptacle 310 and holding unit 340 in an arrangement similar to that depicted in FIG. 2C and discussed earlier.

It is understood that the various preferred versions of the invention are shown and described above to illustrate different possible features of the invention and the varying ways in which these features may be combined. Apart from combining the different features of the foregoing versions in varying ways, other modifications are also considered to be within the scope of the invention. Following is an exemplary list of such modifications.

First, while it was previously noted that the various components of the container are preferably made of paperboard, plastic or other materials are also a possibility. However, containers made of non-paperboard materials are generally more expensive to produce, manufacture, and recycle (at least at the time this document was written).

Second, in the container 200, it might be possible to simply use a single combined inner receptacle 210 and holding unit 240 in place of the two components (i.e., to make a watertight or water-resistant holding unit 240 which removed the need for the inner receptacle 210). However, it is preferred to use a holding unit 240 to protect the inner receptacle 210 from puncturing and leaking, i.e., to allow the holding unit 240 to serve as a barrier which receives damage in lieu of the inner receptacle 210.

Third, it is also possible to fill the inner receptacle 210 of the container 200 of FIG. 2 with floral foam or some other porous displaceable and/or puncturable material, so that the inner receptacle 210 will better resist water spillage and will better retain any flora contained within the inner receptacle 210. However, this is generally not necessary unless the flora contained within the inner receptacle 210 are intended for immediate display after the container 200 arrives at its destination.

Fourth, while the foregoing discussion emphasized how the inner receptacles 210 and 310 are watertight or water resistant, it should be understood that a non-liquid-tight receptacle might be used where flora which do not require water—such as dry flora—are in issue.

Fifth, the engaging tabs 286 and 386 in particular may adopt a variety of forms, and might additionally or alternatively be provided at locations away from the outer sleeve corners 274 and 374. They can additionally be provided in greater or lesser quantities than those depicted in the drawings, and can even be provided at different heights of the sidewalls 218 and 318, e.g., to support both the tops and bottoms of holding units 240 and 340 (if desired).

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A container for shipping and/or display of flora comprising:
   a. a holding unit having circumferential holding unit sides extending about a holding unit top opening from which flora may protrude;
   b. an outer sleeve, separate from the holding unit, including outer sleeve sidewalls having an outer sleeve interior passage extending between an outer sleeve bottom and an outer sleeve top, wherein the outer sleeve sidewalls are readily separated into:
      (1) a lower sidewall portion wherein the entirety of the holding unit may be fit, and
      (2) an upper sidewall portion extending above the lower sidewall portion, and further wherein:
         (1) the outer sleeve interior passage is sized to closely and complementarily receive the holding unit sides therein in the lower sidewall portion,
         (2) the outer sleeve sidewalls include engaging tabs defined thereon on the lower sidewall portion, the engaging tabs being foldable into the outer sleeve interior passage to alternatively:
            i. support the holding unit within the interior passage in the lower sidewall portion below the engaging tabs, and between the engaging tabs and the outer sleeve bottom, and
            ii. support the holding unit in the lower sidewall portion above the engaging tabs to extend upwardly from the lower sidewall portion.

2. The container of claim 1 wherein the engaging tabs each extend across at least two of the outer sleeve sidewalls.

3. The container of claim 1 wherein:
   a. the outer sleeve top has closure flaps extending therefrom, the closure flaps being foldable to close the outer sleeve interior passage; and
   b. the outer sleeve bottom defines a terminal end of the outer sleeve sidewalls, whereby the outer sleeve interior passage remains open at the outer sleeve bottom.

4. The container of claim 1 wherein:
a. the outer sleeve sidewalls have sidewall corners resting therebetween; and
b. the outer sleeve bottom has foldable bottom flaps defined thereon, the bottom flaps being spaced from the sidewall corners.

5. The container of claim 1:
a. further comprising a liquid-retaining inner receptacle having a receptacle bottom and an opposing top receptacle opening wherein flora may be inserted, and
b. wherein the holding unit top opening is sized for insertion of the receptacle bottom therein, whereby the inner receptacle may be fit into the holding unit so flora inserted in the inner receptacle protrudes from the holding unit top.

6. The container of claim 5 wherein the inner receptacle is at least partially formed of foamed plastic having an outer liquid-resist shell provided thereon.

7. The container of claim 5 wherein:
a. the holding unit includes engagement flaps, each engagement flap extending from a first area on the holding unit to a second area on the holding unit wherein the engagement flap is inserted, and
b. the engagement flaps engage the inner receptacle when:
   (1) the inner receptacle is fit into the holding unit, and
   (2) the engagement flaps are inserted into the holding unit.

8. The container of claim 5 wherein:
a. the inner receptacle has a narrowed cross-sectional area between the receptacle bottom and the top receptacle opening, and
b. the holding unit includes engagement flaps, each engagement flap extending from a folding end spaced from the holding unit top opening, the engagement flaps being foldable from their folding ends toward the holding unit top opening to engage the narrowed cross-sectional area of the inner receptacle when the inner receptacle is fit into the holding unit.

9. A container for dripping and/or display of flora comprising:
a. a holding unit including holding unit sides extending between a holding unit bottom and a holding unit top, the holding unit top having a holding unit top opening defined therein from which flora may protrude;
b. an outer sleeve separate from the holding unit, the outer sleeve including outer sleeve sidewalls:
   (1) extending between an outer sleeve bottom and an outer sleeve top,
   (2) surrounding an outer sleeve interior passage sized to closely receive the holding unit wherein with the holding unit sides resting closely adjacent the outer sleeve sidewalls, and
   (3) being separated by outer sleeve corners having engaging tabs defined thereon, the engaging tabs being:
      i. foldable into the outer sleeve interior passage to support the holding unit therein, and
      ii. defined on the outer sleeve sidewalls at such a height between the outer sleeve bottom and the outer sleeve top that the holding unit, when supported within the interior passage atop the encasing tabs, dog not extend above the outer sleeve top.

10. The container of claim 9:
a. further comprising a liquid-retaining inner receptacle having a receptacle bottom and an opposing top receptacle opening wherein flora may be inserted, and
b. wherein the holding unit top opening is sized to receive the receptacle bottom therein, whereby the inner receptacle may be at least partially received within the holding unit top opening so flora inserted in the inner receptacle protrudes from the holding unit top.

11. The container of claim 10 wherein:
a. the holding unit includes at least one engagement flap, each engagement flap extending from a folding end foldably extending from the holding unit to an engagement end engaged within a slot in the holding unit, and
b. each engagement flap holds the inner receptacle within the holding unit top opening when the inner receptacle is fit into the holding unit top opening.

12. The container of claim 9 wherein:
a. the outer sleeve has a lower sidewall portion wherein the entirety of the holding unit may be fit, and whereupon the engaging tabs are defined, and
b. an upper sidewall portion is separable from the lower sidewall portion, and further wherein the upper sidewall portion may be separated from the lower sidewall portion and the engaging tabs may be folded into the interior passage, whereupon the holding unit may be inserted into the lower sidewall portion to be supported upon the engaging tabs.

13. The container of claim 12 wherein:
a. the lower sidewall portion has the outer sleeve bottom defined thereon;
b. the upper sidewall portion has the outer sleeve top defined thereon; and
c. the holding unit, when inserted into the lower sidewall portion to be supported upon the engaging tabs, is spaced from the outer sleeve bottom.

14. A container for shipping and/or display of flora comprising:
a. a liquid-retaining inner receptacle having a receptacle bottom and an opposing top receptacle opening wherein flora may be inserted;
b. a holding unit including holding unit sides extending between a holding unit bottom and a holding unit top, the holding unit top having a holding unit top opening defined therein, the holding unit top opening being sleeved for insertion of the receptacle bottom whereby the inner receptacle may be fit into the holding unit so flora inserted in the inner receptacle protrudes from the holding unit top opening;
c. an outer sleeve separate from the holding unit, the outer sleeve including outer sleeve sidewalls surrounding an outer sleeve interior passage, wherein:
   (1) the outer sleeve interior passage is sized to closely receive the holding unit sides therein,
   (2) the outer sleeve sidewalls include engaging tabs defined thereon, the engaging tabs being foldable into the outer sleeve interior passage to support the holding unit within the interior passage.

15. The container of claim 14 wherein the engaging tabs each extend across at least two of the outer sleeve sidewalls.

16. The container of claim 14 wherein the inner receptacle is:
a. at least substantially formed of a paperboard blank folded to define the inner receptacle, and
b. maintained in the form of the inner receptacle without the assistance of adhesives.

17. The contain of claim 14 wherein:
a. the inner receptacle has a narrowed cross-sectional area between the receptacle bottom and the top receptacle opening, and b. the holding unit has engagement flaps defined adjacent the holding unit top opening, the engagement flaps being foldable toward the holding unit top opening to engage the narrowed cross-sectional area of the inner receptacle when the inner receptacle is fit into the holding unit.

18. The container of claim 17 wherein the engagement flaps include:
   a. a folding end at which they are folded, the folding end being located spaced from the holding unit top opening, and
   b. an engagement end spaced from the folding end, the engagement end having a concave area defined therein, wherein the concave area engages the narrowed cross-sectional area of the inner receptacle when the inner receptacle is fit into the holding unit.

19. The container of claim 1 wherein the upper and lower sidewall portions are joined by a perforated boundary.

20. The container of claim 9 wherein:
   a. the outer sleeve is readily separable into
      (1) a lower sidewall portion having the engaging tabs defined thereon, and
      (2) an upper sidewall portion above the engaging tabs, and
   b. the holding unit, when supported within the interior passage atop the engaging tabs after removal of the upper sidewall portion, protrudes from the interior passage of the lower sidewall portion.

21. The container of claim 20 wherein the upper and lower sidewall portions are joined by a perforated boundary.

22. The container of claim 14 wherein:
   a. the outer sleeve is readily separable into
      (1) a lower sidewall portion having the engaging tabs defined thereon, and
      (2) an upper sidewall portion above the engaging tabs, and
   b. the holding unit, when supported within the interior passage atop the engaging tabs after removal of the upper sidewall portion, protrudes from the interior passage of the lower sidewall portion.

23. The container of claim 22 wherein the upper and lower sidewall portions are joined by a perforated boundary.

\* \* \* \* \*